United States Patent [19]

Wood et al.

[11] Patent Number: 5,031,062

[45] Date of Patent: Jul. 9, 1991

[54] METHOD AND APPARATUS FOR REDUCING DISK DISTORTION UNDER CLAMPING LOAD IN A DISK DRIVE APPARATUS

[75] Inventors: Joseph A. Wood, Longmont; Dennis Ogden; Scot Graham, both of Boulder, all of Colo.

[73] Assignee: PrairieTek Corporation, Longmont, Colo.

[21] Appl. No.: 643,446

[22] Filed: Jan. 18, 1991

Related U.S. Application Data

[63] Continuation of Ser. No. 318,892, Mar. 3, 1989, abandoned.

[51] Int. Cl.$^5$ .................... G11B 17/08; G11B 17/02
[52] U.S. Cl. ............................ 360/98.08; 360/99.12
[58] Field of Search ............... 360/98.08, 98.01, 99.12

[56] References Cited

U.S. PATENT DOCUMENTS

| | | | |
|---|---|---|---|
| 3,745,543 | 7/1973 | King .................................. | 360/103 |
| 4,616,278 | 9/1986 | Yamaguchi et al. ............. | 360/99.12 |
| 4,661,875 | 4/1987 | Kinjo ................................ | 360/98.08 |
| 4,739,427 | 4/1988 | Kilmer et al. ................... | 360/98.08 |
| 4,754,351 | 6/1988 | Wright ............................. | 360/98.08 |
| 4,945,432 | 7/1990 | Matsudaira et al. ............. | 360/98.02 |

OTHER PUBLICATIONS

IBM Technical Disclosure Bulletin, vol. 21, No. 2, Jul. 1978, Besha et al.

*Primary Examiner*—A. J. Heinz
*Assistant Examiner*—Jefferson Evans
*Attorney, Agent, or Firm*—Sheridan, Ross & McIntosh

[57] ABSTRACT

A method for assembling disks in a disk drive apparatus is disclosed, as well as the resultant assembly. The method reduces the occurrence of disk head crashes resulting from penetration of the air bearing on which the disk head rides because of one or more surface irregularities found in the disk surface at or near inner diameter portions of the disk which lead to rippling of the disk surface. The elimination or reduction in size of the surface irregularities is achieved using a flowable filler material that is received by the surface irregularities and remains therein after the disk or disks are clamped to a spindle. The filler material is preferably an adhesive and it reduces any differences in the surface topography of the disk and the accompanying clamping-related parts. Bowing of the disk at its inner diameter portions due to uneven clamping forces is also reduced in the present invention. The resultant assembly has particular utility for use with smaller diameter disks having a diameter of about 95 mm or less.

18 Claims, 3 Drawing Sheets

METHOD AND APPARATUS FOR REDUCING DISK DISTORTION UNDER CLAMPING LOAD IN A DISK DRIVE APPARATUS

This is a continuation, of application Ser. No. 07/318,892, filed Mar. 3, 1989, now abandoned.

FIELD OF THE INVENTION

The present invention relates to an assembly including mounted disks that reduces disk distortion due to clamping forces which can cause unwanted flying height modulation, contact between the disk head and the disk, which could cause speed modulation or head crashes due to the disk contact.

BACKGROUND OF THE INVENTION

Disk drives commonly use spindles to rotate one or more disks that are connected to the spindle. To read or write information on the surface of a magnetic disk, a read/write head or transducer is positioned at a desired location relative to the disk surface. The head flies microinches from the surface of the disk, supported by an air bearing surface. If the air bearing is unreliable and the head is able to penetrate past the air bearing, the head can unwantedly contact the surface of the disk leading to a crashing of the head, speed modulation of the spindle or read/write signal modulation. All of these possibilities seriously impair proper operation of the disk drive. The air bearing can be penetrated as a result of one or more of a number of circumstances. In connection with the present invention, it has been found that flying height modulation can occur due to distortion of the disk caused by clamping forces applied to the disk. This distortion is characterized by either rippling of the disk near the clamping zone or by a bowing or coning of the disk. Ripples can be caused by clamping a disk, which is not flat, against flat surfaces, or by clamping the disk against entrapped contamination. Optical measurements of the disk indicate that ripples commonly occur because of one or more surface irregularities in the disk surface due to processing of the disk. These ripples can be as large as about 100 microinches peak to peak. This problem is especially present on smaller diameter disks due to the thin cross section of such disks. Similarly, thinner disks are much more sensitive to distortion due to clamping forces. The trend toward lower and lower flying heights also exacerbates this problem as it has been demonstrated that lower flying height is more susceptible to modulation due to ripples. When rippling of the disk, particularly near the inner diameter is large enough (peak-to-peak) or of sufficiently short wavelength, the head can contact the disk at the tip of the air bearing surface of the head.

Bowing of the disk refers to a cone-like angle that is defined by the disk surface as it projects outwardly from its inner diameter at the area along which the disk is clamped, such as to a spindle. Bowing results from clamping forces that are non-concentric or, if opposing clamping forces occur at different diameters, a concentrated moment load is produced at the clamping area or disk inner diameter. This moment can result from contamination, out of flatness or taper of the disk or elements that contact or support the disk. As the disk portions become more remote or farther away from the clamping area, the elastic energy associated with the moment dissipates, i.e. the cone-like angle decreases and the surface of the disk no longer appears to have the cone-like shape. Because of the bowing of the disk, when the read/write head flies adjacent to the inner diameter of the disk, different ends of the head can be closer to the disk surface. This causes the magnetic gap to vary in distance from the disk, resulting in signal amplitudes that can vary over a 2:1 range. Such bowing may be controlled or overcome by use of additional mechanical parts or adjustments of mechanical parts alone, but is not necessarily a cost effective solution. Additionally, when the disk is bowed, the tip and tail of the head are closer to the disk and could contact the disk due to disk runout.

The distortion problem is not found, or is not as acute, in larger size disks because the amount of distortion required to cause a problem is a function of the size of the disk and the ratio of the disk size to the head size. Consequently, with disk drives utilizing larger and thicker disks and having essentially the same size head as found in a disk drive with 2.5 inch disks, any wavelength associated with such a comparable ripple on a larger size disk is significantly greater so that the critical wavelength leading to head/disk interference is not so likely to occur.

In order to eliminate, or at least reduce, the distortion of the spinning disk, the amplitude associated with the rippling must be reduced and the uneven clamping forces must also be reduced. The present invention is directed to solving such problems by eliminating or reducing any difference in the surface topography of the disk and the connecting or clamping-related surfaces, which include, in one embodiment, a spacer element that is positioned between two disks that are clamped to a spindle. This is accomplished using a flowable filler material, preferably having tensile properties, that is received by surface irregularities that might be found on the disk surface in or on the spacer element, the clamping area and the inner diameter of the disk. The filler material becomes rigid or hardens so that, after the material fills the surface irregularities and sets, it does not flow out from such irregularities after the disk or disks are clamped to the spindle but, rather, provides a more uniform interface between the disks and its clamping-related parts.

The use of a solidifiable liquid with a floppy disk is disclosed in U.S. Pat. No. 4,387,114 of Conner et al. issued on June 7, 1983, and entitled "Spindle Aperture Reinforcement for a Floppy Disk." The solidifiable liquid acts as a reinforcement member about the central opening of the floppy disk and is intended to reduce or eliminate damage at this area during the course of normal use of the floppy disk. To form the reinforcement member, the solidifiable liquid fills a reservoir defined at the central opening and the liquid subsequently solidifies.

SUMMARY OF THE INVENTION

An assembly and method are provided for eliminating or reducing disk head crashes due to distortion of the disk. The present invention has particular utility with disks that are smaller in size, i.e., about 95 mm in diameter or less. Briefly, the method relates to filling surface irregularities that are typically found in disk surfaces near or at their inner diameter, where the disk or disks are clamped to a spindle, which is used in rotating the disk or disks. In one embodiment, the spindle is part of a spindle motor assembly. Each irregularity that might be found at the clamping area and its mating surface receives a flowable filler material that sets or hardens whereby any difference in the topography of the disk surface and the mating surface is eliminated or reduced using the material filling the irregularities.

In one embodiment of the invention in which two hard disks are utilized, a spacer element is positioned between the two disks to separate or space them from each other. The spacer element is located near the inside diameter of the disk. The filler material is provided at the interface between one of the two disks and a first surface of the spacer element and also at the interface between the second of the two disks and a second, opposite surface of the spacer element. In a preferred embodiment, the flowable material is an adhesive having tensile properties. When a concentrated moment is imposed on the disk near its inner diameter, the tensile strength of the adhesive resists the moment and resists the formation of the cone-like angle thereby reducing the bowing problem. However, the rippling problem can be compensated for by using virtually any flowable filler and an adhesive is not necessary. It should also be understood that virtually any flowable adhesive will reduce the rippling and bowing problems, but an adhesive with lower viscosity, about 2-100 centipoise, has practical advantages, such as being more readily flowable.

Based on the foregoing summary, a number of worthwhile advantages of the present invention are readily discerned. An assembly is disclosed, which is used in disk drives that utilize smaller diameter disks, wherein reduced disk distortion due to clamping of the disk is achieved. The reduced distortion has been overcome by an assembly that includes a filler material that is received in surface irregularities found in disk surfaces and their contacting surfaces. The material is preferably an adhesive that hardens so that it does not escape from the irregularities after the disks are clamped in place.

Additional and/or related advantages of the present invention will be readily understood from the following discussion, particularly when taken in conjunction with the accompanying drawings.

DETAILED DESCRIPTION

In accordance with the present invention, an assembly is provided as part of a disk drive apparatus. The assembly generally includes a spindle to which one or more disks are mounted. The spindle can be rotated using a motor located at a distance from the spindle. Although not necessary for use with the inventive features of the present invention, one form of an assembly is a spindle motor assembly, with a preferred configuration, except for the inventive features, being disclosed in U.S. Pat. Application Ser. No. 07/162,799, filed Mar. 1, 1988, U.S. Pat. No. 4,933,785 entitled "Disk Drive Apparatus" and assigned to the same assignee as the present invention. With regard to this embodiment, and with reference to FIG. 3, hereof, a spindle motor assembly 10 is shown, which is part of a disk drive apparatus that uses one or more small diameter disks 12, i.e. about no greater than 95 mm in diameter, because of the particular problems addressed by the present invention, which problems would seriously affect proper disk drive operations when such smaller disks are utilized.

Figure 1:
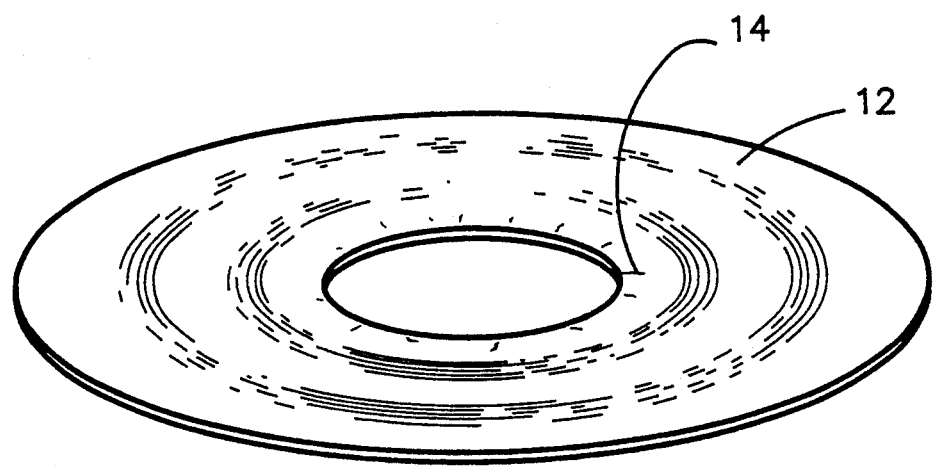
FIG. 1 illustrates a smaller diameter disk of the present invention having an irregularity in the surface thereof near its inner diameter.
Figure 2:
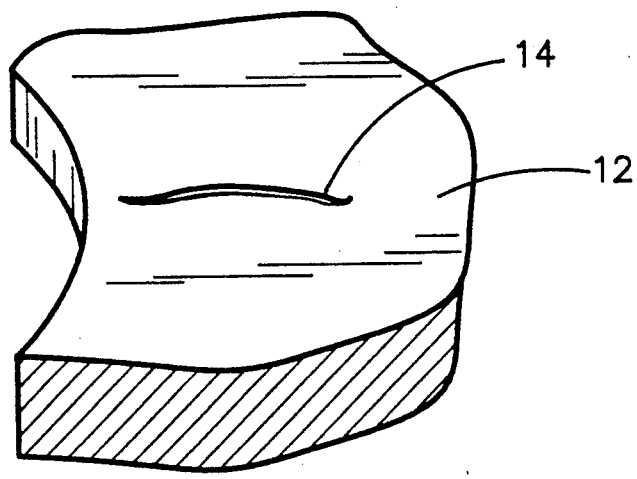
FIG. 2 is a fragmentary, enlarged illustration of the surface irregularity shown in FIG. 1.

With reference now to FIG. 1, a smaller diameter disk 12 is illustrated that includes a surface irregularity 14. An exaggerated illustration of the surface irregularity 14 is seen in FIG. 2. When disks 12 are made, it is common for surface irregularities 14 to be formed in the surfaces of the disks 12. The surface irregularities 14 of concern typically have a height in a range of about up to 100 microinches. Such surface irregularities 14 near or at the inner diameter of the disk 12 cause the foregoing described disk distortion problems during disk operations, after the disks 12 are clamped to and become part of the spindle motor assembly 10. It is not feasible to eliminate such surface irregularities 14 in the manufacture of the disks 12. It is therefore necessary to eliminate or reduce their detrimental effects on disk drive read/write operations by other means. This is accomplished by the present invention, which utilizes a filler material that is received by the surface irregularities 14.

Figure 4:
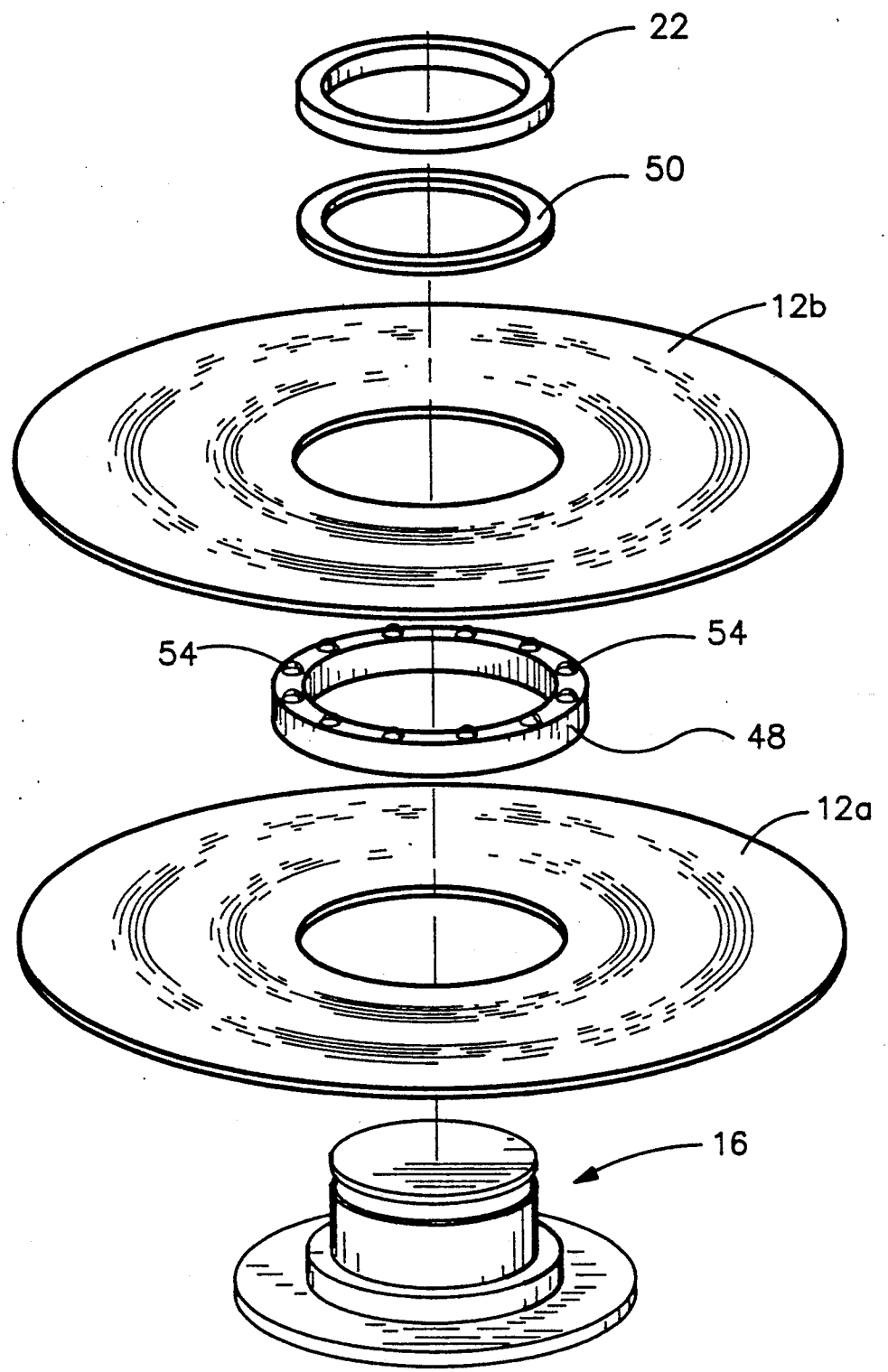
FIG. 4 is an exploded view of the spindle motor assembly of FIG. 3 illustrating the positioning of the adhesive material relative to the spacer element before the spacer element and disks are joined together.
Figure 3:
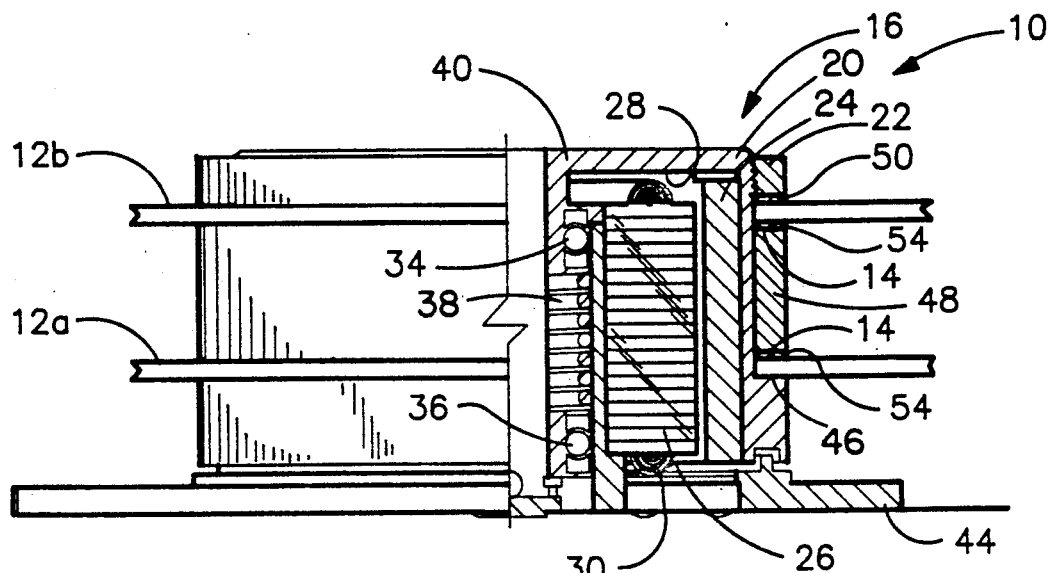
FIG. 3 illustrates an embodiment of a spindle motor assembly in which two disks are utilized and with portions thereof being cut away to expose the parts of the spindle motor assembly and also illustrating the adhesive that fills the surface irregularities formed in each disk surface.

With reference now to FIGS. 3 and 4, the spindle motor assembly 10 is illustrated. The illustrated assembly is substantially the same as that disclosed in U.S. pat. No. 4,933,785, except for the improvement provided by the present invention, which includes the flowable material used to fill the surface irregularity or irregularities 14. Specifically, the spindle motor assembly 10 includes a rotor assembly 16 to which the disks 12 are mounted. During operation, the rotor assembly 16 spins or rotates and carries the disks 12 with it. The rotor assembly 16 includes a shell or body 20 within which further motor parts are contained. A clamp ring 22 is connected to the top of the shell 20. The clamp ring 22 is preferably threaded for engaging a threaded upper circumferential edge of the shell 20 whereby the clamp ring 22 is fastened to the shell 20. Adjacent to the inner wall of the shell 20 is a magnet 24, which is also part of the rotor assembly 16. Contained within the shell 20 are motor stator parts including a number of stator laminations 26 which are located in a chamber 28. Disposed within the stator lamination 26 is magnet wire windings 30. A pair of bearings 34, 36 are provided in the end portions of the longitudinal stator lamination stack. A compression spring 38 is held between the two bearings 34, 36 for use in preloading the bearings 34, 36. The spring 38 surrounds portions of a motor shaft 40. The motor shaft 40 is integral with the top of the shell 20 and extends towards the bottom of the shell 20. As can be readily appreciated, the aforesaid motor parts are also found in the non-cutaway part of FIG. 3 of the spindle motor assembly 10 since there is symmetry between the two sides of the spindle motor assembly 10. The rotor assembly 16 moves relative to a base member 44, which is slightly spaced from the bottom of the rotor assembly 16.

With respect to the mounting of one or more disks 12 so that they become part of the spindle motor assembly 10, the inside diameter portions of the first disk 12a is positioned on a flange 46 formed in the shell 20. A spacer element 48 is provided over the first disk 12a. The second disk 12b is positioned on top of the opposite end of the spacer element 48. Preferably, a washer 50 is located on top of the inner diameter portions of the second disk 12b before the clamp ring 22 is used to clamp the disks 12a, 12b to the rotor assembly 16. In conjunction with the present invention, filler material 54 is provided at the interfaces between the upper and lower surfaces of the spacer element 48 and those surfaces of the disks 12a, 12b, which come in contact with the spacer element 48.

Figure 6:
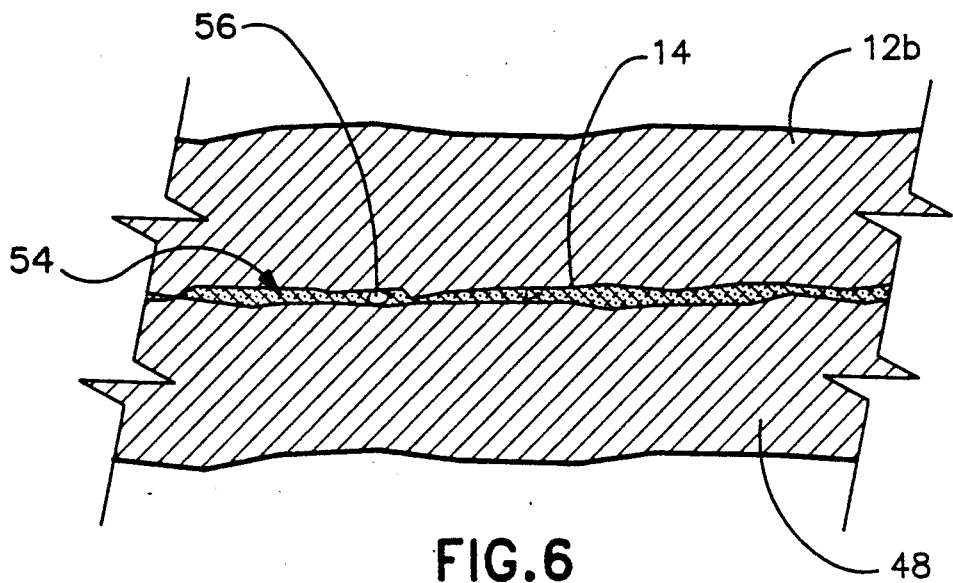
FIG. 6 is a greatly enlarged illustration of the interface between the disk surface and the spacer element depicting the adhesive material filling the surface irregularities at the interface between the inner diameter of the disk and the spacer element, and the inclusion of a debris particle in the filler material.

The filler material 54 is received by each surface irregularity 14, which is found in each of the surfaces of the disks 12a, 12b at the interfaces communicating with the spacer element 48, which is near the inner diameter of the disks 12a, 12b. The filler material 54 acts to eliminate, or at least meaningfully reduce, topographic differences among portions of the disk surfaces, as well as providing a substantially uniform interface between the spacer element 48 and the disks 12a, 12b, near or at the inner diameter of the disks. The filling in of the surface irregularities 14 with the filler material 54 is also illustrated in FIG. 6, which depicts a greatly enlarged or exaggerated view of a surface irregularity 14, which is found at the interface between the spacer element 48 and the disk 12b. FIG. 6 also illustrates that one or more very small particles of debris 56 can also become lodged in the disk/spacer interface but the filler material 54 is able to be received by the surface irregularity 14 and surround the debris 56 to provide the desired uniform surface topography. The filler material 54 is a material that is able to flow relatively easily into such surface irregularities 14 and, after being received by the surface irregularities 14, hardens or sets so that, when the disks 12a, 12b are held to the rotor assembly 16 by clamping, such material remains in the surface irregularities 14 and does not flow out therefrom to maintain the desired uniformity or lack of surface topographic differences. In the preferred embodiment, the filler material 54 is a flowable adhesive. Preferably, the adhesive has a range of viscosity of between about 2-100 centipoise. It is further preferred that a lower viscosity adhesive be utilized so that a very thin bond line results thereby reducing tolerance stack up in the spindle motor assembly 10. It has been observed that an adhesive of 5 centipoise viscosity accomplishes the objectives of the present invention, a suitable adhesive being identified by the brand name "Loctite 420."

Figure 5:
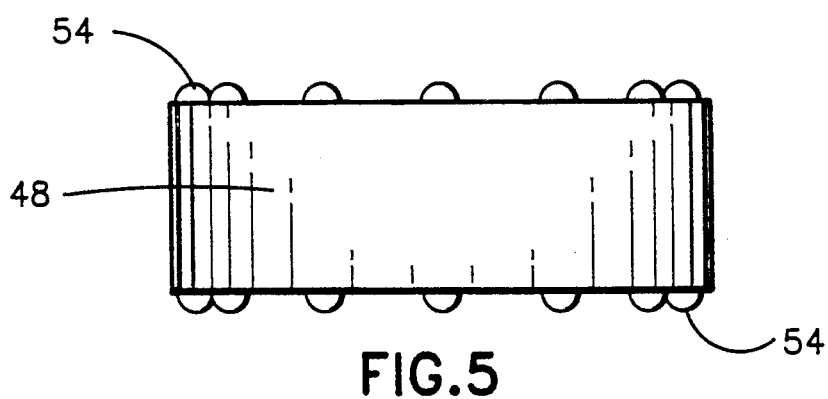
FIG. 5 is an enlarged, front view of the spacer element showing the adhesive material on both sides of the spacer element.

In connection with applying or providing the filler material 54 so that it is received by the surface irregularities 14 found in the surfaces of the disks 12a, 12b, further reference is made to FIG. 4, as well as FIG. 5. In one embodiment of applying the filler material 54, small areas or dots of the filler material or adhesive 54 are spaced about the upper and lower surfaces of the spacer element 48 so that, when the spacer element 48 engages the inner diameter portions of the disks 12a, 12b, the filler material 54 can readily flow and be received by the surface irregularities 14. In the embodiment shown, twelve such equally spaced dots are provided on the upper and lower surfaces of the spacer element 48. More particularly, with regard to the assembly of the pertinent portions of the spindle motor assembly 10 to achieve the filling of the surface irregularities 14, a mandrel is preferably utilized to initially assemble together the two disks 12a, 12b and the spacer element 48, along with the filler material 54. In that regard, the spacer element 48 is first thoroughly cleaned. The bottom surface of the first disk 12a is placed onto the mandrel at the inner diameter portions of the first disk 12a. The adhesive material is then applied, using a desired number of dots, around the lower side of the spacer element 48. This side of the spacer element 48 with the adhesive material 54 on it is placed down onto the inner diameter portions of the top surface of the first disk 12a and the spacer element 48 is properly seated at this desired position. The adhesive material 54 is then applied to the upper surface of the spacer element 48. The second disk 12b is then placed so that its bottom surface, at the inner diameter portions thereof, comes in contact with and engages the upper surface of the spacer element 48 so that the second disk 12b is properly seated. The adhesive material 54 is able to flow into and be received by the surface irregularities 14 in the top surface of the first disk 12a and the bottom surface of the second disk 12b to achieve the sought for elimination or reduction in surface topographic differences. The adhesive material 54 is also allowed to cure or harden, for about 30 seconds, so that it is ensured that the adhesive material 54 will not flow out of any of the surface irregularities 14 when the disks 12a, 12b are clamped. After curing therefore, this subassembly of disks 12a, 12b, spacer element 48, together with the filler material 54 filling the surface irregularities 14, is clamped to the rotor assembly 16, or when a spindle is used, this subassembly is clamped to the spindle.

When the disks 12a, 12b are rotated during subsequent read/write operations, the amplitudes of ripples, previously produced by the surface irregularities at the inner diameters of the disks, are substantially eliminated or reduced so that unwanted distortion does not occur and the read/write head does not penetrate the air bearing on which it rides whereby head contact with the disk surface and crashing of the head does not occur. Likewise, less distortion of the disk occurs due to non-uniform clamping forces because the assembly of disks and spacer is much stiffer than the individual pieces. The generation of the cone-like angle formed at the clamping area is also substantially eliminated or reduced further ensuring proper read/write operations as the heads fly over the disk surfaces on their respective air bearings.

It should be understood that, in another embodiment, the adhesive filler material 54 could be used to bond the disks 12 to the spacer element 48, as well as to the flange 46 of the shell 20. It was observed that this approach also substantially eliminated the distortion problem. However, such a solution is less advantageous, since it is sometimes necessary to rework the spindle motor assembly 10 and he bonding of the disks 12a, 12b and the spacer element 48 to a spindle or the rotor assembly 16 makes it more expensive to accomplish the rework. That is, in the case in which the disk or disks are joined to a spindle or the rotor assembly via the flange using the adhesive-like material, it is not feasible to discard only the disks and spacer element; rather, the spindle or the rotor assembly must also be discarded because of its bonding to the disks through the use of the adhesive-like material 54.

In another embodiment of filling the surface irregularities 14 with the filler material 54, a wicking-like operation can be utilized. That is, a low viscosity adhesive is injected using a small diameter dispenser positioned by the assembler between the interfaces of the upper and lower surfaces of the spacer element 48 and the disks 12a, 12b. In this two disk embodiment, the adhesive dispenser can be used to access the interfaces from the inner side of the spacer element 48 to better avoid inadvertently dispensing adhesive on those portions of the disks outside of the clamping area. In such a case, the two disks and the spacer element are assembled together, along with the adhesive, as a subassembly using a fixture that permits their assembly whereby the inner side, which is to be positioned adjacent to the spindle or the rotor assembly, of the spacer element is readily accessible by the adhesive dispenser. By capillary action, the low viscosity adhesive material is able to flow to and be received by the surface irregularities 14. It should be understood that the lower viscosity adhesive, about 5 centipoise, also wicks into the surface irregularities 14 more readily than a higher viscosity adhesive. It is also extremely important that sufficient adhesive be applied to completely fill all the surface irregularities.

Based on testing, it also appears that the filler material 54 need only be applied to those surfaces of the disks 12a, 12b that contact the upper and lower surfaces of the spacer element 48. That is, the aforesaid distortion problems are overcome without the need to fill in any surface irregularities that might be found on the disk surface contacting the flange 46 and the disk surface contacting the clamping part. Consequently, further assembly time can be saved by not having to use adhesive at these inner diameter portions of the disks, as well as avoid further complicating the aforesaid process.

Although the afore-described illustrated embodiment depicts a two disk application, the present invention also has utility with a single disk embodiment, as well as embodiments having more than two disks. With regard to the single disk embodiment, the adhesive-like material can be provided on the flange of the shell of the rotor assembly whereby, when the inner diameter portions of the single disk are placed on the motor flange, the adhesive-like material is able to be received by the surface irregularities or spaces found on the bottom surface of the single disk adjacent to the inner diameter portions thereof. In another embodiment for applying the adhesive-like material, the flange is somewhat hollowed out for receiving a ring element on which the adhesive-like material is provided for subsequent receipt by one or more surface irregularities found on the disk surface adjacent to the ring element. In yet another embodiment, the adhesive-like material is provided on the bottom surface of the clamp ring so that the adhesive-like material is able to be received by any surface irregularity found in the top surface of the single disk. In such an embodiment, a washer is not utilized between the clamp ring and the inside diameter portions of the disk. With regard to more than two disks, application of the adhesive-like material can be achieved using one or more combinations of the aforesaid methods or embodiments for applying the adhesive-like material so that it is properly received by any surface irregularity found in at least one of the surfaces of the disks adjacent to the inner diameters of the disks.

Based on the foregoing description, a number of important features associated with the present invention are identified. Disk surface topographic differences are eliminated or reduced by the filler material received by the surface irregularities found in the disk surfaces whereby unwanted contact and crashes of the read/write heads are avoided. Because of the more even distribution of forces in the clamping area, higher clamping forces can be achieved, which may lead to reduction of shifting of the disk under shock loads. The resulting flat and uniform surfaces achieved on the upper and lower surfaces of the spacer element provide a more even stress distribution in the clamping area. This feature coupled with the rigidity of the spacer element can be a very important part of the ability to use high clamping loads as the stiffness of the spacer element reduces unwanted deflection in the disks during clamping thereof. Additionally, the use of a lower viscosity adhesive as the filler material provides a very thin bonding line, which reduces tolerance stack-up in the spindle motor assembly. The use of the filler material can also be restricted to those sides of the disk surfaces that actually contact the spacer element.

The foregoing description of the invention has been presented for purposes of illustration and description. Further, the description is not intended to limit the invention to the form disclosed herein. Consequently, variations and modifications commensurate with the above teachings, in the skill or knowledge of the relevant art, are within the scope of the present invention. The embodiments described hereinabove are further intended to explain best modes known of practicing the invention and to enable others skilled in the art to utilize the invention in such, or other, embodiments and with the various modifications required by their particular applications or uses of the invention. It is intended that the appended claims be construed to include alternative embodiments to the extent permitted by the prior art.

What is claimed is:

1. An assembly for a disk drive apparatus, comprising:
    at least a first disk having at least one surface irregularity, said surface irregularity including an indentation located in a first surface of said first disk adjacent to an inner diameter of said first disk, said first disk having a diameter no greater than about 95 millimeters;
    first means for contacting at least portions of said first disk;
    second means for connecting said first disk to said first means; and
    third means, being fluidic and having viscosity, disposed on at least one of said first disk and said first means for filling said indentation located in said first disk surface adjacent to said first disk inner diameter, said viscosity of said third means being relatively low wherein said third means is initially flowable to substantially fill said indentation but becoming substantially rigid thereafter so that said third means substantially remains in said indentation wherein topographic differences among portions of said first disk surface due to said indentation are reduced and wherein substantially none of said third means in said indentation extends beyond said first disk first surface.

2. An assembly, as claimed in claim 1, further including:
a second disk connected to said first means and wherein said first means includes a spacer element positioned between said first disk and said second disk.

3. An assembly, as claimed in claim 1, wherein:
said first means includes a spindle motor assembly.

4. An assembly, as claimed in claim 1, wherein:
said third means includes an adhesive.

5. An assembly, as claimed in claim 4, wherein:
said adhesive has a viscosity in the range of about 2-100 centipoise.

6. An assembly, as claimed in claim 1, wherein:
said third means is located on only one side of said first disk.

7. An assembly, as claimed in claim 1, wherein:
said second means includes clamping means.

8. An assembly, as claimed in claim 1, wherein:
said first disk has a diameter of about 2.5 inches.

9. An assembly, as claimed in claim 1, wherein:
said third means includes a plurality of small areas of an adhesive positioned initially on portions of said first means.

10. An assembly, as claimed in claim 1, wherein:
said indentation has a particle located at least partially therein and said third means substantially surrounds the particle.

11. An assembly, as claimed in claim 1, wherein:
said third means has a thickness in said indentation that is different along a longitudinal extent of said indentation.

12. A method for overcoming head crashes in a disk drive apparatus by reducing disk distortion due to at least one of bowing of a disk and rippling of a disk near its inner diameter when the disk is clamped in which such disk distortion can cause at least portions of the head to penetrate in air bearing on which the head is able to ride and then unwantedly contact a surface of the disk, comprising:
providing a first disk having a first surface irregularity that includes an indentation located therein, said indentation being located adjacent to an inner diameter of said first disk and said first disk having a diameter no greater than about 95 millimeters, said first surface irregularity being such that, if uncompensated for, it contributes to one of unwanted rippling and bowing of said first disk;
positioning said first disk relative to first means;
connecting said first disk to said first means; and
providing an adhesive-like, flowable material in said indentation of said first surface of said first disk,
said material having a relatively low viscosity wherein said material is initially flowable to substantially fill and indentation but becoming substantially rigid thereafter so that substantially none of said material in said indentation extends beyond said first disk first surface and wherein topographic differences among portions of said first disk surface due to said indentation are reduced whereby disk distortion is reduced by substantial elimination of said one of said rippling and bowing of said first disk when a clamping force is applied to said first disk thereby substantially preventing contact between the head and said first surface of said disk.

13. A method, as claimed in claim 12, further including:
positioning a second disk relative to said first means and using a spacer element to separate said first disk from said second disk; and
said step of providing said adhesive-like material includes locating said adhesive-like material on a surface of said spacer element.

14. A method, as claimed in claim 13, wherein:
said step of providing includes applying said adhesive-like material in small areas on each side of said spacer element before contacting said spacer element with each of said first and second disks.

15. A method, as claimed in claim 13, wherein:
said step of providing includes applying said adhesive-like material on only one side of each of said first and second disks and adjacent to the inner diameter of each of said first and second disks.

16. A method, as claimed in claim 13, wherein:
said step of providing said adhesive-like material includes using a dispenser to deliver said adhesive-like material to said indentation using capillary action.

17. A method, as claimed in claim 12, wherein:
said spindle means is a spindle motor assembly having a rotor assembly and said step of providing includes locating said adhesive-like material adjacent to a flange of said rotor assembly.

18. A method, as claimed in claim 12, wherein:
said step of connecting includes using clamping means to connect said first and second disks to said spindle means and said step of providing includes locating said adhesive-like material on a surface of said clamping means.

* * * * *